Patented Nov. 7, 1944

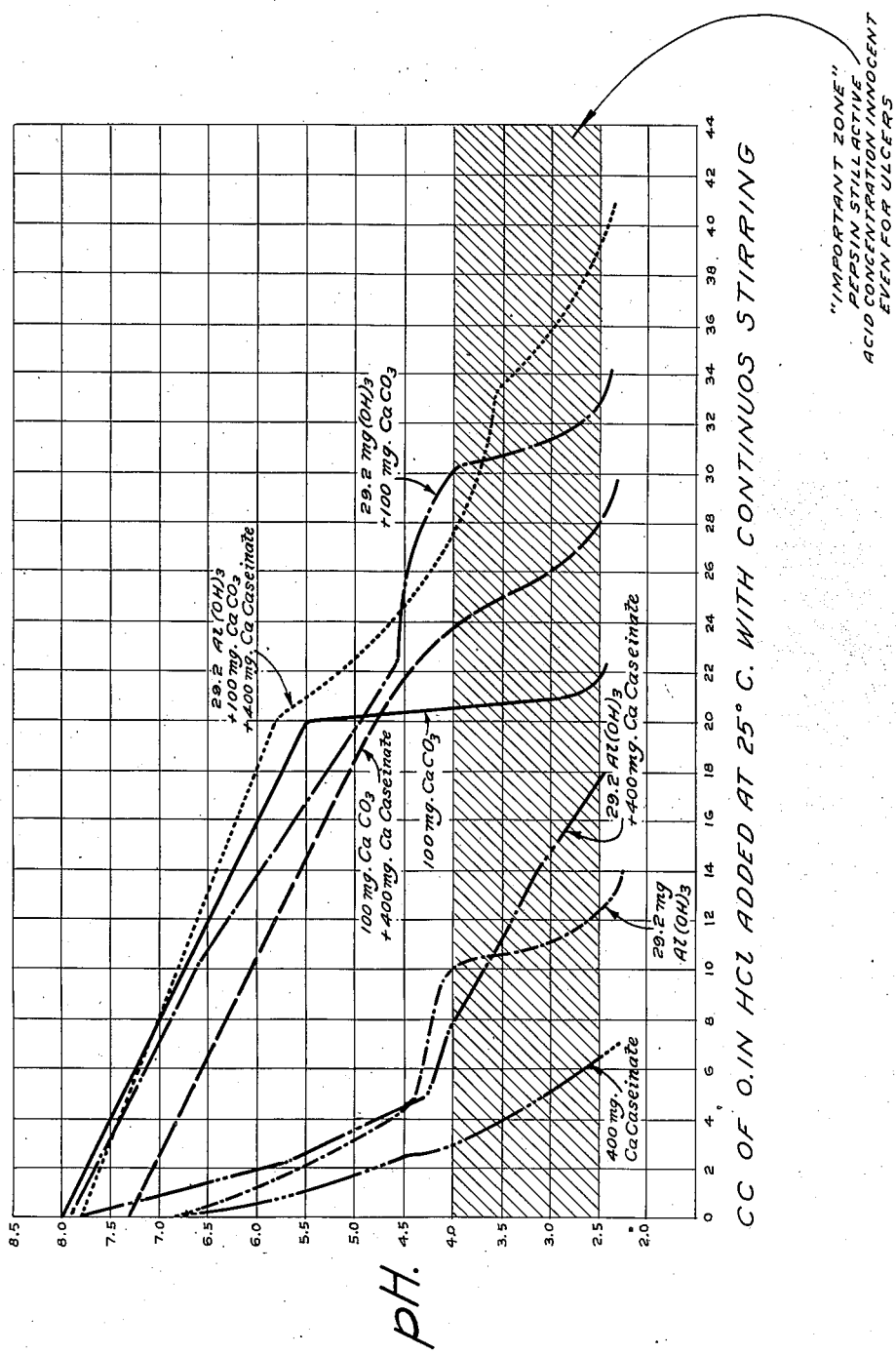

2,362,386

UNITED STATES PATENT OFFICE 2,362,386

ANTIACID COMPOSITIONS

Werner L. Lipschitz, Pearl River, N. Y., assignor to Lederle Laboratories, Inc., New York, N. Y., a corporation of Delaware Application August 16, 1941, Serial No. 407,228

3 Claims. (Cl. 167—55)

The present invention relates to pharmaceutical compositions and more particularly relates to improved anti-acid preparations.

There are several disadvantages accompanying the use of strongly alkaline anti-acid compositions used heretofore for combating gastric acidity. Some of the outstanding disadvantages of such preparations are that they irritate mucous tissues, produce large quantities of carbon dioxide gas, and reduce the acidity of the gastric juices to such an extent that normal digestion processes do not proceed properly.

In accordance with the present invention I have discovered a class of anti-acid compositions which eliminate to a very great extent the disadvantages of the prior art compositions. Briefly, my improved preparations comprise a mixture of casein salts of polyvalent cations with an insoluble carbonate of a polyvalent cation. My preferred compositions are those comprised of a mixture of a casein salt of a bivalent cation with an insoluble carbonate of a bivalent cation. Caseinates suitable for use in producing my composition comprise those such as calcium caseinate, strontium caseinate, magnesium caseinate, and the like, calcium being preferred because of its cheapness and ready availability. Suitable polyvalent carbonates include calcium carbonate, magnesium carbonate, strontium carbonate, bismuth subcarbonate, and the like. It is an advantage of the present invention that my anti-acid compositions, comprising mixtures of protein salts of bivalent cations combined with polyvalent carbonates, are anti-acids having a prolonged neutralization effect and have a protective action on the mucosa. It is a further advantage that the quantity of carbon dioxide gas liberated by the neutralization reaction is less than the quantity that would be liberated by neutralizing an equivalent amount of the corresponding carbonate alone. It is also an advantage that the pH of the gastric fluids is not raised materially beyond that at which normal digestion will take place. It is an advantage that after digestion of the casein salt by pepsin, the basic portions of the protein molecule are set free and there is an increased neutralization effect produced.

The protein salts of the bivalent cations employed in my compositions may be prepared by any suitable method so long as they are of sufficient purity for internal administration. A suitable method for preparing calcium caseinate, for example, having a high degree of purity is as follows:

Fifteen parts of casein (Hammarsten) were dissolved in 200 parts of a solution of 0.63% sodium bicarbonate. The solution of casein in sodium bicarbonate is saturated with carbon dioxide gas and stirred while adding 100 parts of 10% calcium chloride. The liquid portion is decanted off and the residue washed several times with distilled water and decanted. The residue is then dried and results in the production of a yellow powder. The calcium caseinate may then be mixed with calcium carbonate to produce an anti-acid composition, or with the various other polyvalent carbonates mentioned heretofore.

In some instances it may be desirable to produce the protein salts of bivalent cations by reacting casein with a large amount of a bivalent carbonate to result in the production of a product made up of a mixture of the bivalent caseinate and the bivalent carbonate, as follows:

Five grams casein (Hammarsten) and one and a half grams $CaCO_3$ were admixed with 35 cc. distilled water in a mortar with pestle thoroughly until carbon dioxide was gone and a homogeneous mass obtained. This, then, was dried for 24 hours at 70° C.

Five grams casein (Hammarsten) and 1.476 grams of $SrCO_3$ were slowly and carefully mixed by help of 30 cc. distilled water in a glass mortar for 24 hours in an oven. The dried mass then was powdered carefully and kept in a desiccator for several days.

1.383 grams of $MgCO_3 + 3H_2O$ were admixed with five grams casein (Hammarsten) by help of 35 cc. distilled water slowly in a glass mortar with pestle. After most of the carbon dioxide was liberated, the mixture was dried in a Pyrex beaker in an oven at 60° C.

5.2 grams bismuth sub-carbonate (m. w. 519 containing 8.5% $CO_2 = 1$ mol) were carefully mixed with five grams casein and 60 cc. distilled water, then transferred to a Pyrex beaker and dried in a water bath of 55° C.

A number of experiments were carried out in order to illustrate the neutralization effect of various combinations of the mixtures of proteins of casein salts of bivalent cations combined with a polyvalent carbonate. In performing these experiments electrical titrations were made to determine the hydrochloric acid neutralizing effect of the individual components in the mixture, the time of the neutralization, the quantity of carbon dioxide gas produced, and these results compared with those obtained by similar experiments carried out on the various mixtures. The titrations were carried out by methods well known in the art and the carbon dioxide retention was determined by means of the Warburg method which is also well known in the art. The results of these experiments are tabulated in the following table:

tion salt of casein and an insoluble carbonate of a polyvalent cation. It should be understood, however, that other substances may be incorporated therein without materially altering

| Preparation | Used cc. 0.1 N—HCl, then pH = | | | $CO_2$ retention in per cent, when in Warburg vessels at 37° C. | | Min. elapsed until pH—2.5 was reached in mixtures of the powder and sufficient HCl (24° C, continuous stirring) | Increase of pH, after digestion with pepsin (5h 37° C.) |
|---|---|---|---|---|---|---|---|
| | 4 | 3 | 2.5 | Mol HCl | Per 1 mol carbonate were added | | |
| 334 mg. Ca caseinate | 3.0 | 5.0 | 6.4 | | | | |
| $CaCO_3$ 1 m. mol | 20 | 20.3 | 20.8 | 2.0 | 0 | 4-5 | 0 |
| 1 m. mol $CaCO_3$+334 mg. Ca caseinate | 24 | 26 | 28 | | | 20 | 0.75 |
| 0.604 m. mol $CaCO_3$ | 12.8 | 13 | 13.4 | {4.5 / 3.0} | 0 / 0 | | |
| 0.604 m. mol. $CaCO_3$+351.4 mg. Ca caseinate powder | 19 | 21 | 22.5 | {4.5 / 3.0} | 10 / 25 | | |
| $SrCO_3$ 0.65 m. mol | 13 | 13.3 | 13.5 | | | | |
| 0.65 m. mol. $SrCO_3$+334 mg. Sr caseinate | 17.4 | 20 | 21.5 | 2.6 | 25 | | |
| $MgCO_3$ 0.7 m. mol | 14.8 | 15 | 16 | | | | |
| 0.7 m. mol. $MgCO_3$+417 mg. Mg caseinate | 21 | 23.4 | 25 | 2.8 | 7 | | |
| $SrCO_3$ 0.53 m. mol+340.5 mg. Ca caseinate | 16 | 18.5 | 19.6 | {3.0 / 1.6} | 2 / 19 | | |
| $MgCO_3$ 0.6 m. mol+348 mg. Ca caseinate | 18.6 | 21 | 23 | {3 / 1.46} | 6 / 24.6 | | |

In the foregoing table it is clearly shown that the mixture of calcium caseinate and calcium carbonate requires a greater amount of HCl in order to obtain a solution having a pH of 2.5 than would be expected from the amounts of hydrochloric acid required when the individual ingredients are treated separate. It is further noted that in the reaction between calcium carbonate and hydrochloric acid that there is no retention whatever of carbon dioxide, in other words the entire amount of $CO_2$ produced in the neutralization reaction is given off. In the case of the mixture of calcium carbonate and calcium caseinate 25% of the carbon dioxide is retained, or a volume of carbon dioxide liberated is only about three-fourths of that liberated when calcium carbonate alone is neutralized.

It is also noted that there is an elapse of about 20 minutes in the reaction between hydrochloric acid and the mixture of calcium caseinate and calcium carbonate before the pH of the solution has reached 2.5. When calcium carbonate alone is employed elapse of time is only 4–5 minutes. This is an important factor in anti-acid compositions because the neutralization effect is a prolonged one which means that the alkaline reagent is present and, hence, available for neutralizing further quantities of HCl as it is liberated by the system. Furthermore, when the neutralization is rapid and the pH of the gastric juices rises above 4.0, normal digestion processes are retarded.

When calcium carbonate alone is employed, it is noted that there is no increase of the pH value after digestion with pepsin, whereas in the case of the mixture of calcium carbonate and calcium caseinate there is an increase of about .75; this indicates that during digestion of casein, products are obtained which have a further beneficial effect on gastric acidity regulation.

In the drawing, a graph is shown which illustrates comparatively the neutralization reactions between hydrochloric acid and individual components of my anti-acid compositions, and between hydrochloric acid and my anti-acid mixtures. The graph emphasizes the results tabulated in the table above.

As pointed out heretofore my anti-acid composition comprises a mixture of polyvalent ca-
the improved effects of my composition. Among the substances that may be incorporated therein are those such as magnesium trisilicate, aluminum hydroxide, kaolin, charcoal, pectin, or various other substances which might have a prolonged neutralization effect, adsorbent effect or act as a protective to mucous linings.

My compositions may be in the form of bulk powders or in the form of tablets. When they are in the form of tablets, suitable fillers and binders may be incorporated therein.

The proportions of the essential ingredients in my composition may be varied to a considerable extent, the maximum anti-acid effects I believe, however, are obtained when the proportions are approximately equivalent to those produced by reacting five parts of casein with one and a half parts of calcium carbonate which will give a composition containing about 5 parts of calcium caseinate and about one part of calcium carbonate. When other polyvalent caseinates and other polyvalent carbonates are employed the proportions may be adjusted on the basis of molecular weights so that they correspond roughly to those present in the calcium carbonate and calcium caseinate mixture. In the compositions the casein salt of one polyvalent cation may be mixed with an insoluble carbonate of the same or a different polyvalent cation. Similarly, mixtures of the various polyvalent caseinates or polyvalent carbonates may be employed.

What I claim is:

1. An anti-acid composition comprising a mixture containing about one part of calcium carbonate and about five parts of calcium caseinate.

2. An anti-acid composition comprising a mixture of which the essential components thereof consist of a major proportion of calcium caseinate and a minor proportion of calcium carbonate.

3. An anti-acid composition comprising a mixture of calcium carbonate, calcium caseinate and aluminum hydroxide gel, the essential components of said mixture consisting of a major proportion of calcium caseinate and a minor proportion of calcium carbonate.

WERNER L. LIPSCHITZ.